United States Patent [19]

Camm

[11] Patent Number: 5,673,977
[45] Date of Patent: Oct. 7, 1997

[54] FLUID CONTROL SYSTEM FOR TRACTOR TRAILER BRAKE SYSTEM

[76] Inventor: John James Camm, 4 Melrose Avenue, East Malvern, Victoria, 3145, Australia

[21] Appl. No.: 757,513

[22] Filed: Nov. 27, 1996

Related U.S. Application Data

[62] Division of Ser. No. 512,413, Aug. 8, 1995, Pat. No. 5,630,655, which is a division of Ser. No. 196,158, Feb. 22, 1994, Pat. No. 5,464,278.

[30] Foreign Application Priority Data

| Jun. 26, 1992 | [AU] | Australia | PL3047 |
| Mar. 5, 1993 | [AU] | Australia | PL7657 |
| May 13, 1993 | [AU] | Australia | PL8774 |

[51] Int. Cl.$^6$ .................................................. B60T 17/04
[52] U.S. Cl. ............................ 303/7; 188/3 H; 303/28; 303/15
[58] Field of Search ........................... 303/7, 28, 14, 303/29, 30, 48, 85, 86, 8, 13, 15–18; 188/3 R, 3 H

[56] References Cited

U.S. PATENT DOCUMENTS

| 3,482,885 | 12/1969 | Campanini | 303/7 |
| 3,507,542 | 4/1970 | Cannella | 303/7 |
| 5,464,278 | 11/1995 | Camm | 303/7 |

*Primary Examiner*—Douglas C. Butler
*Attorney, Agent, or Firm*—Larson and Taylor

[57] ABSTRACT

A fluid control system for use with vehicles, in particular, trailers, includes a branch conduit (19, 25, 42, 80, 96) which is to be connected to a pressure supply line (20) and a control line (22) to enable priming of the control line (20) so that signals generated upon application of the vehicle brake pedal are more quickly transmitted to the trailer brakes. This overcomes problems associated with delay in application of the trailer brakes. An electrically operated solenoid valve (11) controls fluid flow through the branch conduit so that upon application of the vehicle brake pedal the solenoid valve is operated to open the branch conduit to allow pressurized fluid to flow from the supply line (20) to the control line (22) for a predetermined time period to prime the control line (22). Pressurized fluid from the branch supply conduit is directed longitudinally down the control line (22) by a longitudinally arranged outlet (35, 57) so that substantially all of the fluid is directed to backfill the control line. The system may be embodied in a block arrangement in which bores are drilled in a block housing and in which the branch conduit (19, 25) is formed by passages drilled in the block or may be formed from discrete hose sections and couplings.

12 Claims, 7 Drawing Sheets

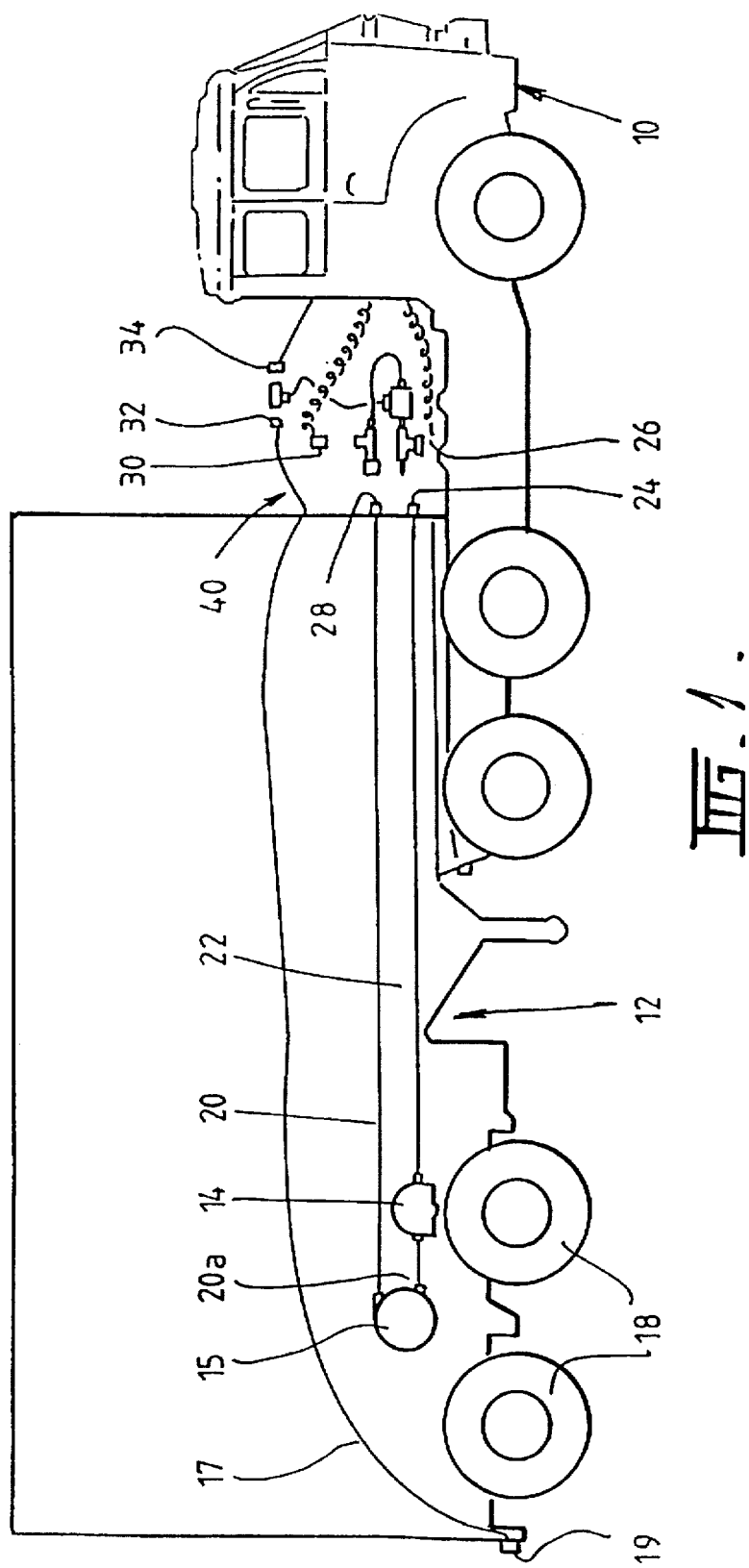

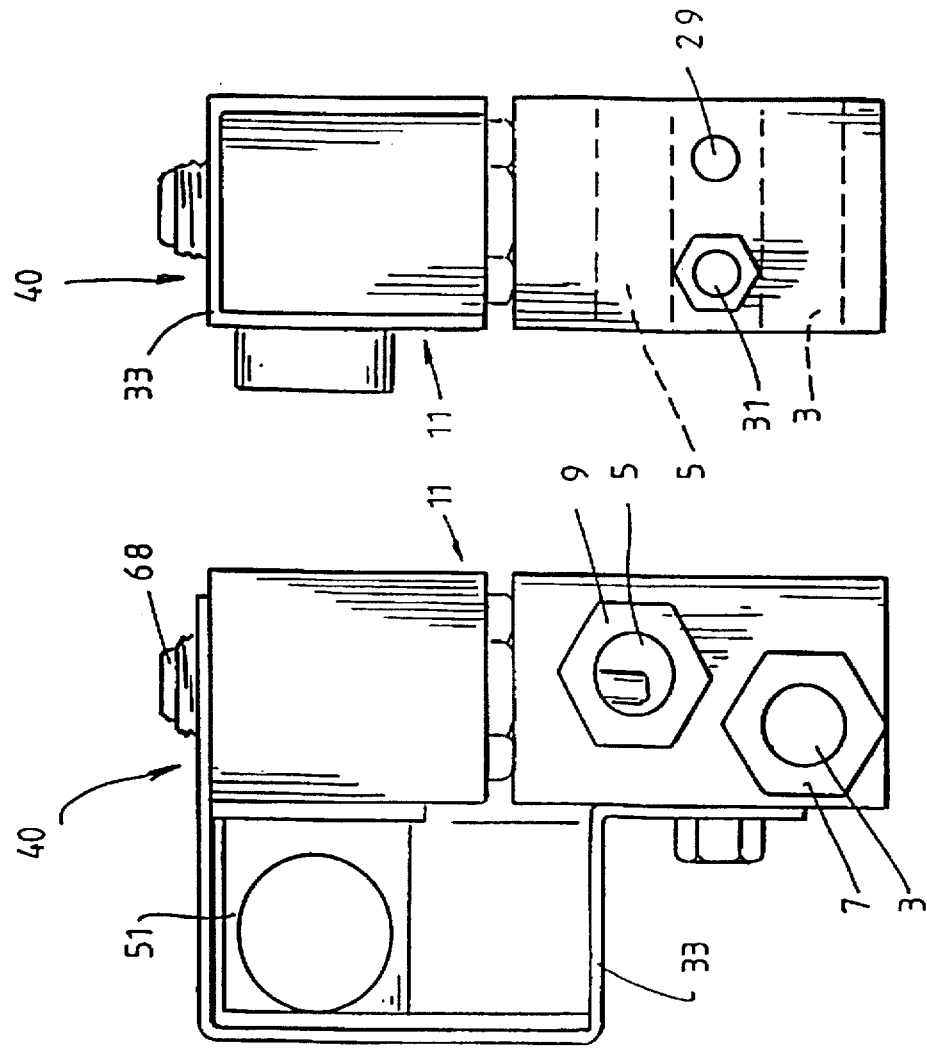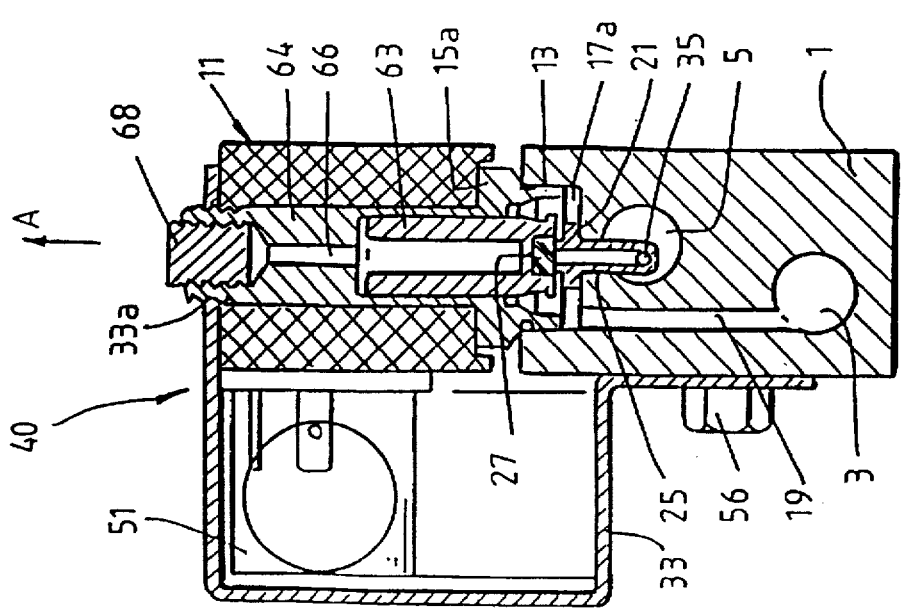

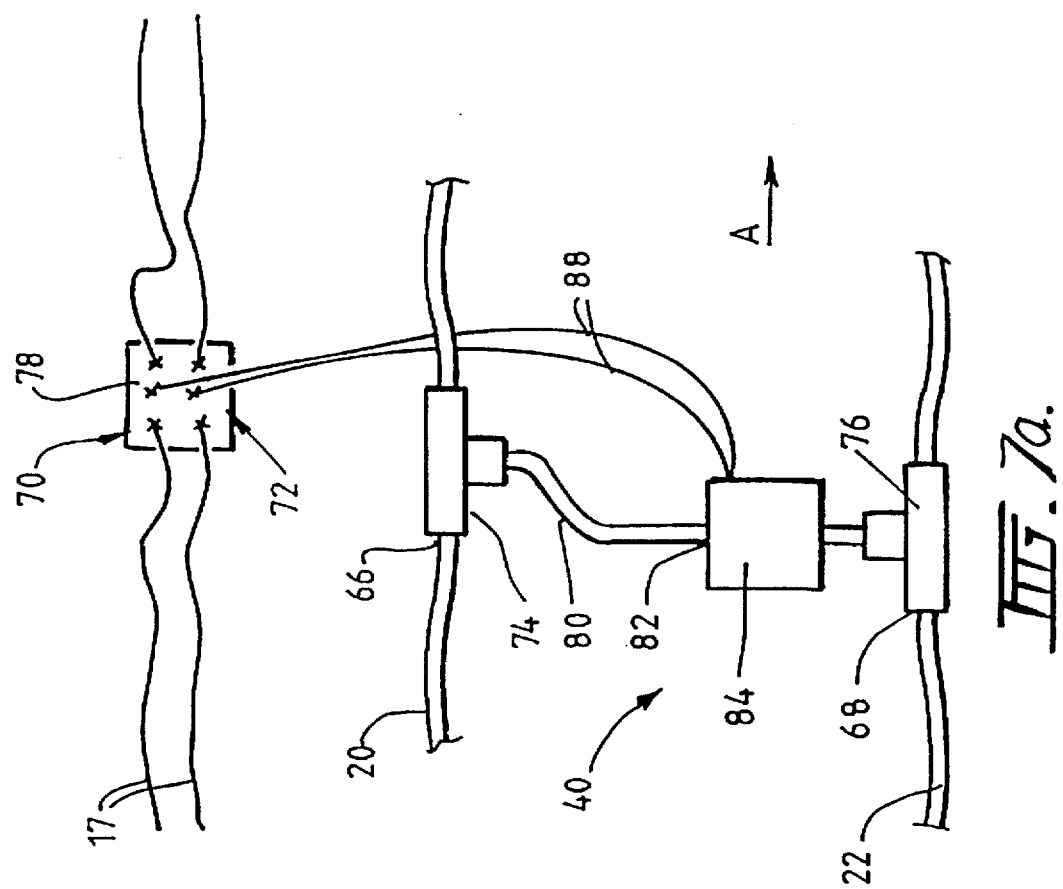
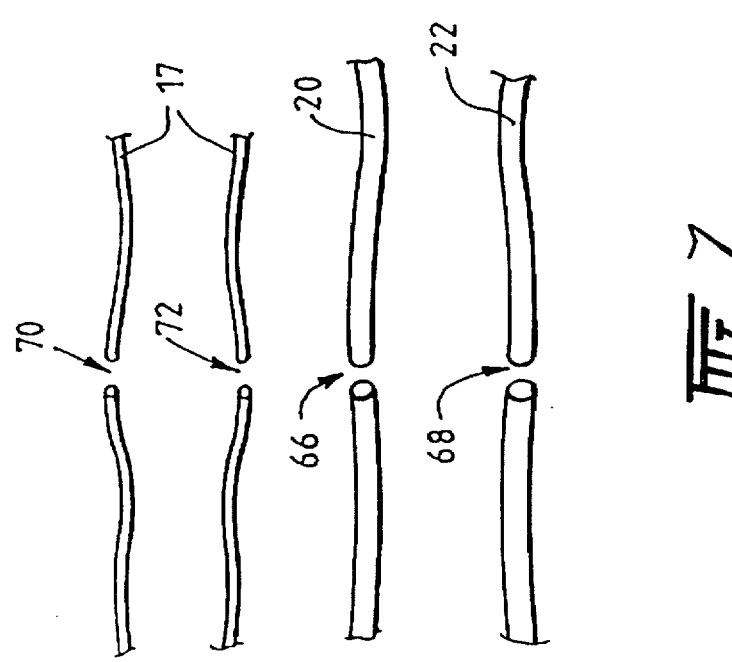

FLUID CONTROL SYSTEM FOR TRACTOR TRAILER BRAKE SYSTEM

This is a division of application Ser. No. 08/512,413 filed Aug. 8, 1995, which issues May 20, 1997 as U.S. Pat. No. 5,630,655 which is a division of application Ser. No. 08/196,158 filed Feb. 22, 1994, now U.S. Pat. No. 5,464,278.

This invention relates to improvements in control systems utilising working fluids, and in particular to pneumatic or hydraulic braking systems such as may be found on vehicles and in particular on semi trailers, trucks and the like.

Australian patent application number 41104/89 discloses brake systems for prime movers and trailers and discuss problems associated with compressed air brake system design and, in particular, premature brake lining wear in a prime mover which results when predominantly gentle braking takes place. The earlier applications propose a system in which compressed air is fed into a brake control line which controls application of the trailer brakes in order to "prime" the trailer brakes system so that there is minimal delay in brake application after the brake pedal is depressed by a driver. The brake control line carries a signal from the foot pedal of the prime mover to a relay valve to activate the relay valve so pressurised fluid can flow from a reservoir which is supplied by a supply line to eventually activate a brake. The invention disclosed in the earlier applications has been found to significantly overcome problems associated with delay in application of the trailer brakes during gentle braking and therefore braking lead is more evenly distributed between the brakes of the prime mover and the trailer thereby decreasing brake lining wear on the prime mover and also providing smoother and enhanced braking characteristics.

Since brake lining wear is associated with the prime mover rather than the trailer, and since prime movers and trailers are often owned by different organisations, it is of more concern to the owner of the prime mover to enhance braking characteristics of the trailer. The systems described in the above Australian patent application propose the injection of pressurised air in the control line at or near the relay valve associated with the trailer brakes. It would be advantageous to allow for injection into the brake control line at the location of the prime mover so that the pneumatic or hydraulic circuitry can be associated with the prime mover rather than the trailer and without the need for additional connection of pneumatic or hydraulic lines and electric cables above that which is normally required when connecting a trailer to a prime mover. Incorporation of the required hydraulic or pneumatic lines in the prime mover which would provide for the above mentioned priming of the trailer brake system would enable the prime mover to be used with conventional trailers and would also ensure that the owner of the prime mover has the advantage of equalising braking load during gentle braking and therefore reducing brake wear on the prime mover.

A first aspect of the invention relates to a fluid control system for a braking system which may be installed in conventional braking systems to provide for priming of a trailer braking system.

The first aspect of the invention therefore provides a fluid control system for a brake system including a supply line, a control line and brake application detection means, comprising:

a housing;

a first conduit supported by the housing;

a second conduit supported by the housing;

attachment means coupled to the first conduit for enabling the first conduit to be coupled in the supply line;

second attachment means coupled to the second conduit to enable the second conduit to be coupled in the control line;

a passage connecting the first conduit to the second conduit; and fluid control means actuatable by the brake application detection means for selectively allowing fluid to flow through the passage from the first conduit to the second conduit; wherein when the fluid control means is actuated by the brake application detection means the fluid control means allows fluid to flow from the supply line and first conduit through the passage to the second conduit and control line to enable backfilling of the control line with fluid.

The fluid control system of the first aspect of the invention can be readily fitted to prime movers, trailers or other vehicles or devices especially where the control line and supply line associated with the prime mover and trailer are in close proximity. Because the passages and conduits are supported by a housing the fluid control system is very robust.

In one embodiment of the invention the first conduit and second conduit may comprise hoses or conduits which are fixed to and supported in a housing. However, in the preferred embodiment of the invention the housing comprises a housing block and the first conduit comprises a first bore through the housing block, the second conduit comprises a second bore through the housing block and the passage is a passageway bored in the housing for connecting the first bore to the second bore.

In the preferred embodiment of the invention the arrangement of the bores and passage within the block housing lends itself to mass production in NC lathes and the like which can minimise production costs.

Preferably the block has a cavity and the fluid control means is connected to the cavity to close the cavity to define a chamber, the passage comprising a first passage portion leading from the first bore to the chamber and a second passage portion leading from the chamber to the second bore, the fluid control means having a valve element which shuts off the second passage portion and when actuated by the brake application detection means the valve element moves away from the second passage portion to allow fluid to flow through the first passage portion into the chamber through the second passage portion and into the second bore.

Preferably the fluid control means comprises a solenoid valve.

Preferably the cavity has a screw thread and the solenoid valve has a mating screw thread so that the solenoid valve can be connected to the housing block by interengagement of the screw threads.

Preferably the brake application detection means comprises electric wiring from a brake light system and electronic controller for actuating the solenoid valve for a predetermined time period.

In the prior art systems described above, it has been found that the injection of compressed air into a control line upstream from a relay does not provide as good results as when the compressed air is injected in the vicinity of the relay. We expect this occurs because the compressed air is introduced into the control line by virtue of a T-piece and therefore only half the air travels down the control line with the remainder of the air travelling in the opposite direction to be vented to atmosphere.

An object of the second aspect of the invention is to overcome this problem.

The invention in a second aspect provides a fluid control system for a braking system including a relay valve for receiving a supply of pressurised fluid from a supply line and a control line for supplying a control signal to the relay valve to actuate the relay valve to enable pressurised fluid to flow from the supply line to vehicle brakes to actuate the vehicle brakes, comprising:

- a conduit for coupling between a source of pressurised fluid and said control line;
- a control valve for selectively allowing pressurised fluid to flow through the conduit, said control valve being actuatable in response to a braking event to enable pressurised fluid to flow through the conduit and into the control line; and
- an outlet of the conduit being positioned relative to the control line such that pressurised fluid exiting the conduit and entering the control line is directed in the longitudinal direction of the control line.

Since the conduit has its outlet in the longitudinal direction of the control line, pressurised fluid which enters the control line to prime the trailer brake system is directed down the control line thereby enabling the control line to be filled to the desired priming volume or pressure even when the conduit is coupled to the control line remote from the relay valve. The positioning of the conduit outlet in the direction of the longitudinal axis of the control line ensures that substantially all of the air in the conduit is injected down the control line and is used to prime the control line when the conduit joins the control line remote from the relay valve. Thus, problems which are associated with joining the conduit to the control line by a perpendicular part of a T-piece where only half the air flows into the control line to prime the control line are overcome. Thus, the fluid circuitry can be associated with the prime mover remote from the relay valve on the trailer while still providing adequate priming of the trailer brake system and thereby overcoming delay in application of the trailer brakes during gentle braking applications.

A third aspect of the invention concerns the provision of fluid circuitry and a method of installation which can be associated with the prime mover so that for all intents and purposes when a trailer is connected to the prime mover the connection of the fluid lines is performed in a conventional manner and which will nevertheless still provide priming of the control line to thereby prime the trailer braking system.

This aspect of the invention also provides a method of providing a braking system with a fluid control system for priming the braking system, the braking system including a supply line, a control line and an electrical signal line, the method comprising:

- providing a fluid control system which includes a supply conduit, a control conduit and a passage joining the supply conduit and the control conduit, and an electrically operated control valve for selectively allowing fluid to flow through the passage;
- coupling the supply conduit in the supply line so that fluid in the supply line can flow through the supply line and also into the supply conduit;
- coupling the control conduit in the control line so that fluid in the control line can flow through the control conduit and also into the control line; and
- electrically connecting the electrically operated control valve to the electrical signal line;

wherein upon generation of an electrical signal in the electrical signal line the control valve is actuated to allow fluid to pass from the supply line and supply conduit through the passage and into the control conduit and control line to backfill the control line and prime the braking system.

The supply conduit and control conduit may be coupled in the supply line and control line respectively by locating the fluid control system between a prime mover and a trailer so that the fluid control system is connected to the conventional connectors associated with the prime mover and the conventional connectors associated with the trailer, or may be located at an existing joint in the control line and supply line. However, in another embodiment of the invention the supply conduit and control conduit are coupled in the supply line and control line by making a cut in the supply line and control line and connecting the supply conduit and control conduit in the supply line and control line respectively.

This aspect of the invention also provides a fluid circuit for connection in a control fluid line and a supply fluid line comprising:

- a fluid branch conduit having a first end and a second end, the first end having a control fluid inlet and a control fluid outlet, and the second end having a supply fluid inlet and a supply fluid outlet, the control fluid inlet and control fluid outlet being for connection in the control line, and the supply fluid inlet and supply fluid outlet being for connection in the supply line; and
- a control valve arranged in said fluid branch conduit to selectively allow fluid flow through the branch conduit.

In one embodiment of the invention the fluid branch conduit comprises a flexible hose and the control fluid inlet and control fluid outlet comprise a first connector and a second connector of a different type to the first connector respectively, and the supply fluid inlet and the supply fluid outlet comprise a first connector and a second connector of a different type to the first connector respectively.

In another embodiment the fluid circuit includes a block housing which has a fluid control bore therethrough and a fluid supply bore therethrough, said fluid branch conduit comprising a passage interconnecting the control bore with the supply bore, one end of the control bore having an attachment member forming the fluid inlet and the other end of the control bore having attachment member forming the control fluid outlet, one end of the supply bore having an attachment member forming the supply fluid inlet and the other end of the supply bore having an attachment member forming the supply fluid outlet, said control valve being mounted to the block housing for selectively opening and closing said passage.

This aspect of the invention thereby provides a conduit system which can be connected to a prime mover and which will present a conventional control line outlet and fluid supply outlet for connection to a control line and supply line of a trailer whilst at the same providing a branch conduit which can prime the control line in response to a gentle application of the prime mover brakes so that there is no delay in application of the trailer brakes during gentle braking and so that braking load is evenly distributed between the trailer and the prime mover.

Preferably the control valve is a solenoid valve and is coupled to brake light electrical circuitry for actuating the control valve when a brake pedal is depressed.

Preferably the fluid control system also includes an electrical circuit comprising an electrical connector for connection to the electrical output from the prime mover a parallel circuit between the connector and the control valve for actuation of the control valve, and an electrical output connection for connection to the electric circuit of the trailer.

In one preferred embodiment of the invention where the branch supply conduit is long or prone to damage the control valve is connected in close proximity to the supply line and the branch conduit includes a check valve which is connected in close proximity to the control line. Thus, should any damage occur to the branch supply conduit the check valve will prevent egress of air from the control line and the control valve prevents uncontrolled egress of air from the supply line.

Preferred embodiments of the invention will be described, by way of example, with reference to the accompanying drawings in which:

FIG. 1 is a schematic view of a prime mover and trailer with which the preferred embodiment of the invention is used;

FIG. 2 is a cross-sectional view of a control system according to the preferred embodiment of the invention;

FIG. 3 is a front view of the system of FIG. 1;

FIG. 4 is a side view of the system of FIG. 1;

FIG. 7 is a schematic view relating to installation of the device of preferred embodiments;

FIG. 7A shows installation of a device according to one embodiment;

Figure 5:
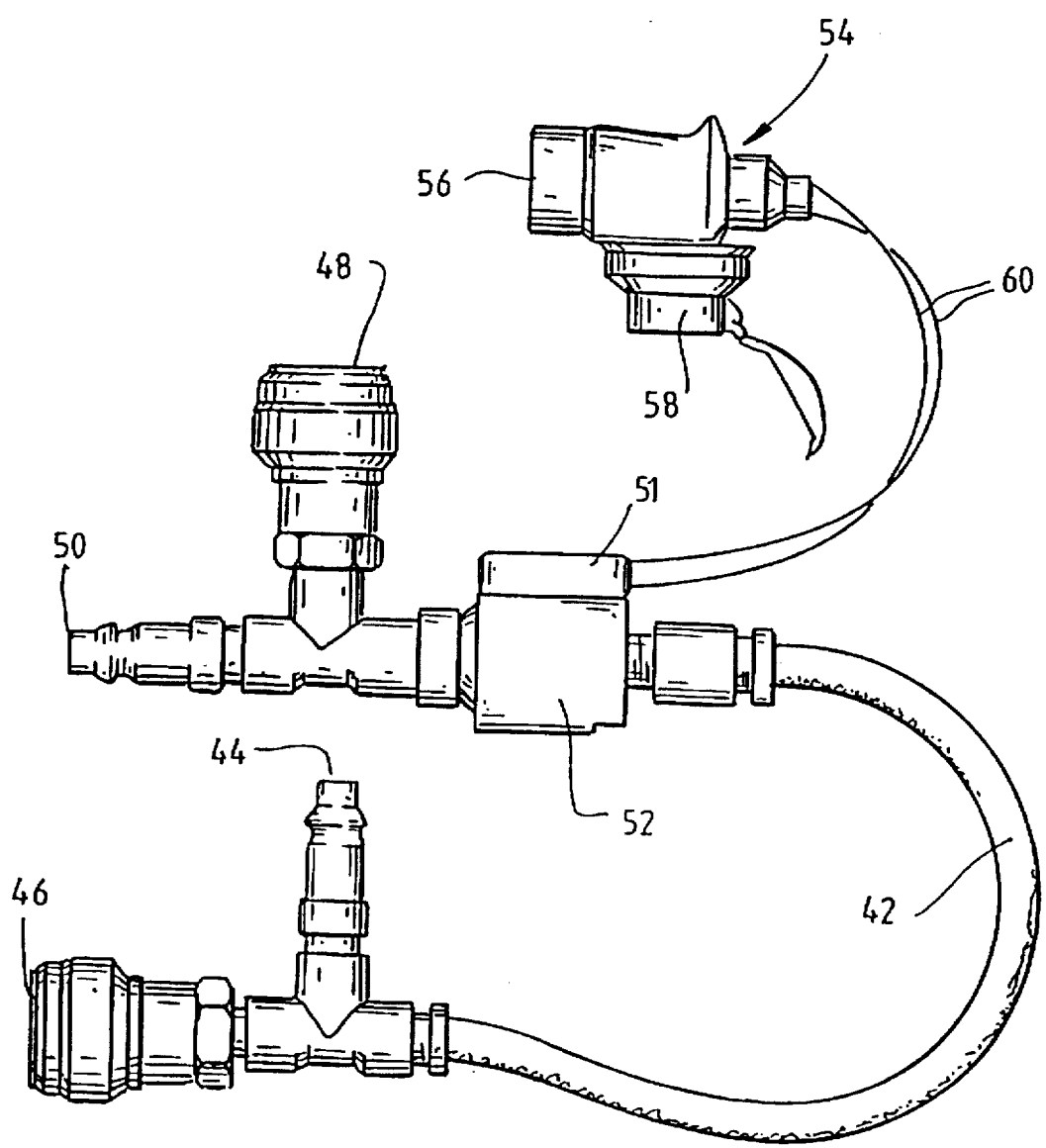
FIG. 5 is a schematic view of a fluid control system and an electrical system according to a second embodiment of the invention.

With reference to FIG. 1 a prime mover 10 and trailer 12 are shown. The trailer 12 has a relay valve 14 which supplies pressurised fluid to brakes (not shown) associated with rear wheels 18 to cause the brakes to be applied. The trailer 12 also has a pressurised fluid supply line 20 which supplies a reservoir 15, and a control line 22. The trailer 12 also has a control line connector 24 associated with line 22 for connection to a control line output 26 associated with the prime mover 10. The trailer 12 also has a connector 28 associated with pressure supply line 20 for connection with a connector 30 of a pressure supply line associated with the prime mover 10. The trailer 12 still further has an electrical connection 32 for connection with an electrical connector 34 associated with the prime mover 10 for providing electric signals on a circuit 17 to activate the trailer brake lights 19 and other lights associated with the trailer.

Conventionally, when the trailer 12 is coupled with the prime mover 10 the connectors 24 and 26, 28 and 30 and 32 and 34 are merely connected together as described above to supply the required fluid control signals, supply fluid and electrical signals to the trailer 12. However, according to the preferred embodiment of this invention a fluid control system and electrical connector system schematically shown as 40 in FIG. 1 is connected to the connectors 26, 30 and 34 of the prime mover.

With reference to FIGS. 2 to 4 a control system 40 according to the first embodiment of the invention is shown for connection in the supply line 20, control line 22 and electrical circuit 17.

In this embodiment the system 40 comprises a housing block 1 formed from steel or other suitable material. The housing block 1 has bores 3 and 5 drilled through it. The housing block is provided with a cavity 17a and a drilled passage 19 extends from the cavity 17a to the bore 3. A second passage 25 is drilled in the block 1 and extends from the cavity 17a to the bore 5. The cavity 17a is provided with screw threads 13 for screw threaded attachment of a solenoid valve 11. An electronic control box 51 is associated with the solenoid valve 11 for actuating the solenoid valve 11.

The solenoid valve 11 is provided with a screw threaded connecting bolt 15a which is screw threaded to the screw threads 13 to attach the solenoid valve 11 to the block 1 and close the cavity 17a.

The bores 3 and 5 are provided with connectors 7 and 9 at each end so that the connectors 7 at the ends of the bore 3 can be connected to connectors 28 and 30 associated with the prime mover and trailer shown in FIG. 1 and the connectors 9 associated with the bore 5 can be connected with the connectors 24 and 26 associated with the prime mover and trailer shown in FIG. 1. The block 1 therefore acts to connect the control line from the prime mover to the control line of the trailer and also the supply line from the prime mover to the supply line of the trailer. In an alternative embodiment the control system 40 shown in FIGS. 2 to 4 my be connected permanently with the trailer by making appropriate cuts in the supply line 20 and control line 22 associated with the trailer and coupling the cut ends of the supply line 20 to the connectors 7 associated with the bore 3 and the cut ends of the control line 22 to the connectors 9 associated with the bore 5. In this manner the block 1 is permanently coupled in the control and supply lines 20 and 22 of the trailer shown in FIG. 1 and the connectors 24, 26, 28 and 30 need only be connected together in the conventional manner when the trailer 12 is coupled to the prime mover 10.

Electrical connectors 32 and 34 may be coupled to control box 51 associated with the solenoid valve 11 or the electrical circuit 17 may be broken into and connected to the control box 51.

The solenoid valve 11 has an armature 64 and a core 63 which carries a rubber valve element 27. The core 63 is able to move in the valve 11 when the valve 11 is energised. The block 1 is provided with a first passage section 19 drilled from a base of the cavity 17a to the bore 3 and a second passage section 25 drilled from the base of the cavity 17a to the bore 5. A hollow insert 21 is located in the passage 25 and extends up into the closed cavity 17a. When the solenoid valve 11 is not energised the valve element 27 seats on the end of the insert 21 to prevent fluid flow from the passage 19 to the passage 25 to prevent fluid flow from the bore 3 to the bore 5 and therefore from the supply line 20 to the control line 22. However, when the brake pedal in the prime mover 10 is depressed, an electric signal in the circuit 17 is supplied to the control box 51 which in turn powers the solenoid valve 11 to cause the core member 63 to move away from the insert 21 in the direction of arrow A in fibre 2 so that pressurised air in the supply line 20 and therefore the bore 3 can pass through the passage 19, the conduit 17a, the insert 21 and into the bore 5 and thus into the control line 22 to backfill the control line and therefore prime the trailer brake system.

The insert 21 is provided with an outlet opening 35 at its outlet end as is shown in FIG. 2. The outlet 35 is directed in the longitudinal direction of the bore 5 so that the air which passes from the bore 3 to the bore 5 is directed down the control line 22 in the longitudinal direction of the control line 22 to backfill the control line 22. The advantage and purpose of directing the fluid flow in the longitudinal direction of the control line 22 will be further described with reference to the embodiment shown in FIGS. 5 and 6.

The control box 51 causes the solenoid valve 11 to activate only for a predetermined time interval so that sufficient pressurised fluid can flow from the bore 3 to the bore 5 to backfill the control line 22 and therefore prime the control line 22. After the predetermined time interval has elapsed the solenoid valve 11 is deactivated so that the core 63 moves in a direction opposite to the arrow A so that valve element 27 seals off the insert 21 to prevent fluid from flowing from the bore 3 to the bore 5.

The block 1 may also be provided with through holes 29 and 31 which are arranged perpendicular to the bores 3 and 5 and which pass through the block 1 without interfering with the bores 3 and 5. The holes 29 and 31 are intended to receive bolts or other fasteners for enabling the block 1 and therefore the control system 40 to be suitably fastened to a particular part of the vehicle or trailer with which it is used.

A cover 33 may be located around the control box 51 and secured to the block 1 by one or more of the bolts or fasteners (schematically shown as 15b in FIG. 2) which pass through the holes 29 and 31. The cover 33 is provided with an opening 33a for location on a nut or plug 68 (which in this embodiment seals the valve 11) and which may be retained in place by that nut or a further fastener to thereby not only provide a cover for the control box 51 but also to secure the solenoid valve 11, control box 51 and the block 1 together.

FIG. 5 shows a second embodiment of the system 40 which includes a fluid branch conduit 42 which may comprise a flexible hose and which has a pressurised fluid inlet 44, a pressurised fluid outlet 46, a control fluid inlet 48 and a control fluid outlet 50. The branch conduit 42 also includes a solenoid valve 52.

The system 40 also includes an electrical connector 54 which has an input plug 56, an output plug 58 and a parallel electric circuit 60 connected to the control box 51 of the solenoid valve 52. The control fluid inlet 48 is coupled to the connector 26 on the prime mover, the pressurised fluid inlet 44 is connected to the connector 30 on the prime mover and the input plug 56 is connected to the electrical connector 34 on the prime mover.

The control fluid outlet 50 and pressurised fluid outlet 46 are presented to the trailer and are configured to be standard connector outlets which are normally associated with the prime mover and which can be directly coupled to the connectors 24 and 28 respectively. Similarly, connector plug 58 is adapted to be coupled with connector 32 on the trailer to provide electrical energy to the trailer 12. Thus, for all intents and purposes once the system 40 is connected to the prime mover a person connecting the trailer 12 to the prime mover will merely be presented with the conventional fluid connectors and electrical connectors which would normally be associated with the prime mover for supplying the required fluid signals and electrical signals to the trailer 12.

Figure 6:
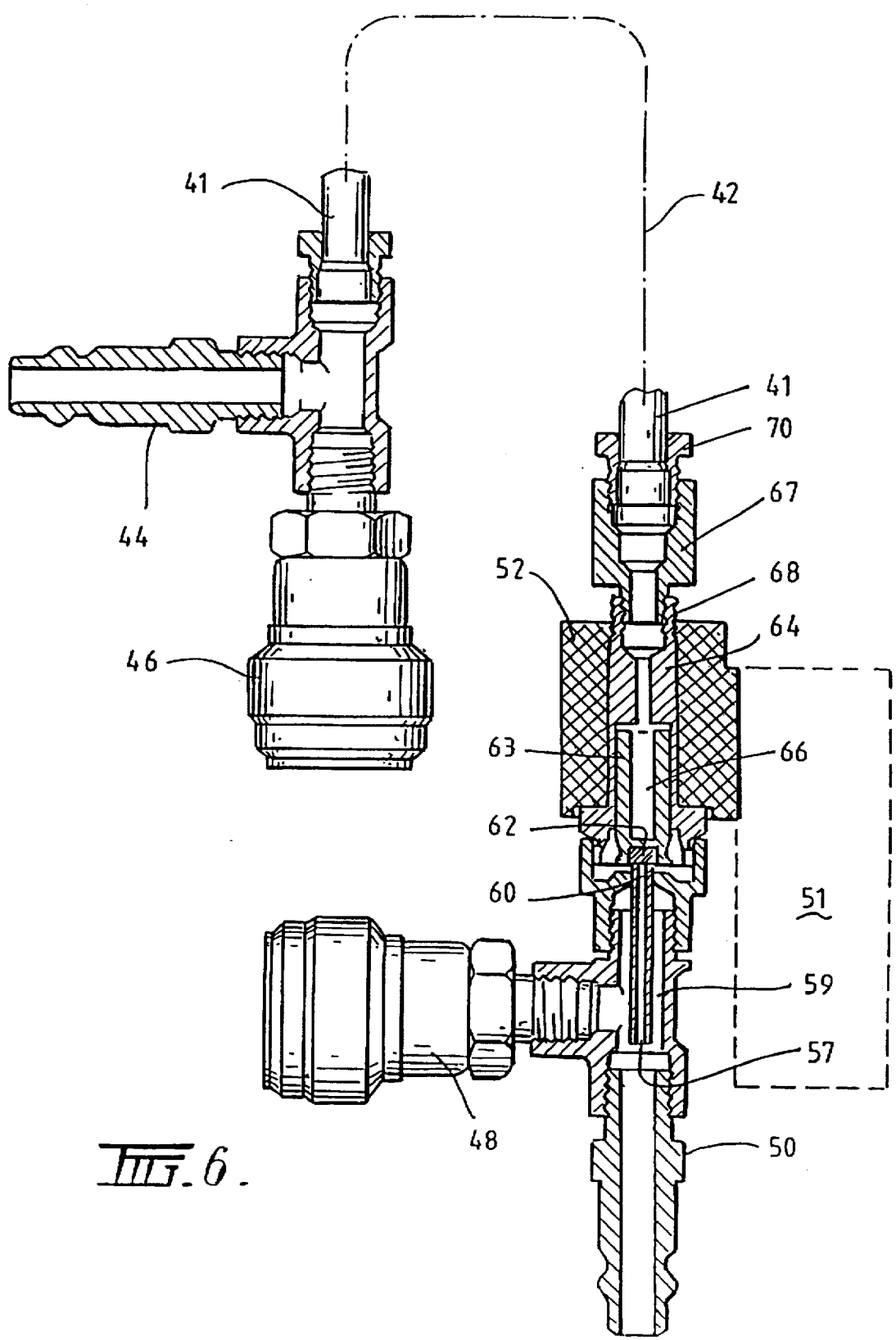
FIG. 6 is a detailed view of the fluid control circuitry of FIG. 5.

With reference to FIG. 6 which shows the branch conduit 42 in more detail, it can be seen that inlet 48 is arranged at an angle with respect to the branch conduit 42. In the embodiment shown the inlet 48 is at right angles to the conduit 42 but it could be arranged at an inclined angle between 0 and 90 degrees and preferably at about 45°. The connector 24 of the fluid control line 22 which connects over outlet connector 50 will therefore be coaxial with the branch conduit 42 so that the outlet 57 of the branch conduit 42 is directed in the longitudinal axial direction of the control line 22 when the connector 50 is connected with the connector 24.

The outlet 57 of the branch conduit 42, in the embodiment shown in FIG. 6, is defined by the end of a tube 59. The tube 59 has an inlet end 60 which is arranged adjacent a valve element 62 of the solenoid valve 52. The solenoid valve 52 is connected in the branch line 42 by an armature 64 which has a passage 66 therethrough. The armature 64 is located in place by a nut 68 which also secures a bolt 67 which is joined to a flexible hose portion 41 of fluid conduit 42 by a further nut 70.

The other end of the hose portion 41 is connected to pressurised fluid inlet 44 which forms a T-branch with pressurised fluid outlet 46.

As previously mentioned the control line outlet 50 and the pressurised fluid outlet 46 are conventional outlet connectors which a prime mover is normally equipped with for connection to corresponding connectors on a trailer. Thus, pressurised fluid is supplied from the inlet 44 into the conduit 42 and out of the outlet 46 to the pressurised fluid line 20 where it is controlled by relay valve 14 for application to the brakes associated with wheels 18 of the trailer 12. The relay valve 14 is controlled by control signals supplied on control line 22 to selectively cause the relay valve 14 to open to allow the pressurised fluid in reservoir 15 to pass to the brakes via portion 20a of the supply line 20 associated with the wheels 18. The supply fluid is also supplied in the branch conduit 42 through the flexible hose portion 41 to the solenoid valve 52.

When a driver applies the prime mover brakes the electrical signal which is generated to activate the brake lights 19 (FIG. 1) associated with the trailer 12 is supplied to connector 56 (FIG. 2) and therefore electrical signals are applied on parallel circuit 60 to the electrical control box 51 of the solenoid valve 52. This activates the solenoid valve 52 so that core member 63 to which valve element 62 is connected is moved away from the end 60 of the tube 59. Pressurised air therefore is able to flow through the hose 41, the nut 70, bolt 67, passage 66 about the core 63 and into the tube 59 where it is injected into the control line 22 in a direction substantially parallel to the longitudinal axis of the control line 22 through connector 50 and connector 24. Since the pressurised fluid is injected into the fluid control line 22 in the direction of its longitudinal axis the momentum of the pressurised fluid results in substantially all of the pressurised fluid passing into the control line 22 and substantially none of the pressurised fluid flowing back out through the inlet 48. Thus, injection of the pressurised air into the fluid control line 22 in the direction of its longitudinal axis results in rapid priming of the fluid control line 22 so than control signals generated upon application of vehicle brakes are rapidly supplied to the relay valve 14 to cause operation of the trailer brakes.

Although in the preferred embodiment of the invention the tube 59 is provided which has an outlet end 57 slightly downstream of the position where the inlet 48 joins the conduit 42, it would be possible to provide a shorter tube 59 or no tube at all since the injection of the pressurised fluid in the longitudinal direction of the line 22 will ensure that substantially all of the fluid flows into the line 22 and not out through the inlet 48.

The preferred embodiment of the invention thereby provides a system for enabling a prime mover to be plumbed so that when a conventional trailer is connected to it the braking system of the trailer can be primed to ensure that there is no lag in application of the trailer brakes during gentle braking of the prime mover. Thus, the brakes of the prime mover are not unduly worn and general braking efficiency of the prime mover trailer combination is improved.

Although in this embodiment of the invention it is preferred to arrange the tube 59 so that it is coaxial with the portion of the control line 22 downstream from the tube 59, it would be possible to arrange the tube 59 or outlet from the branch supply line 42 so that it is at an angle and effectively forms a Y-join with the control line. This would still result in the outlet being directed down the control line and substantially all, if not totally all, of the pressurised fluid in the supply conduit 42 being directed down the control line.

Figure 7B:
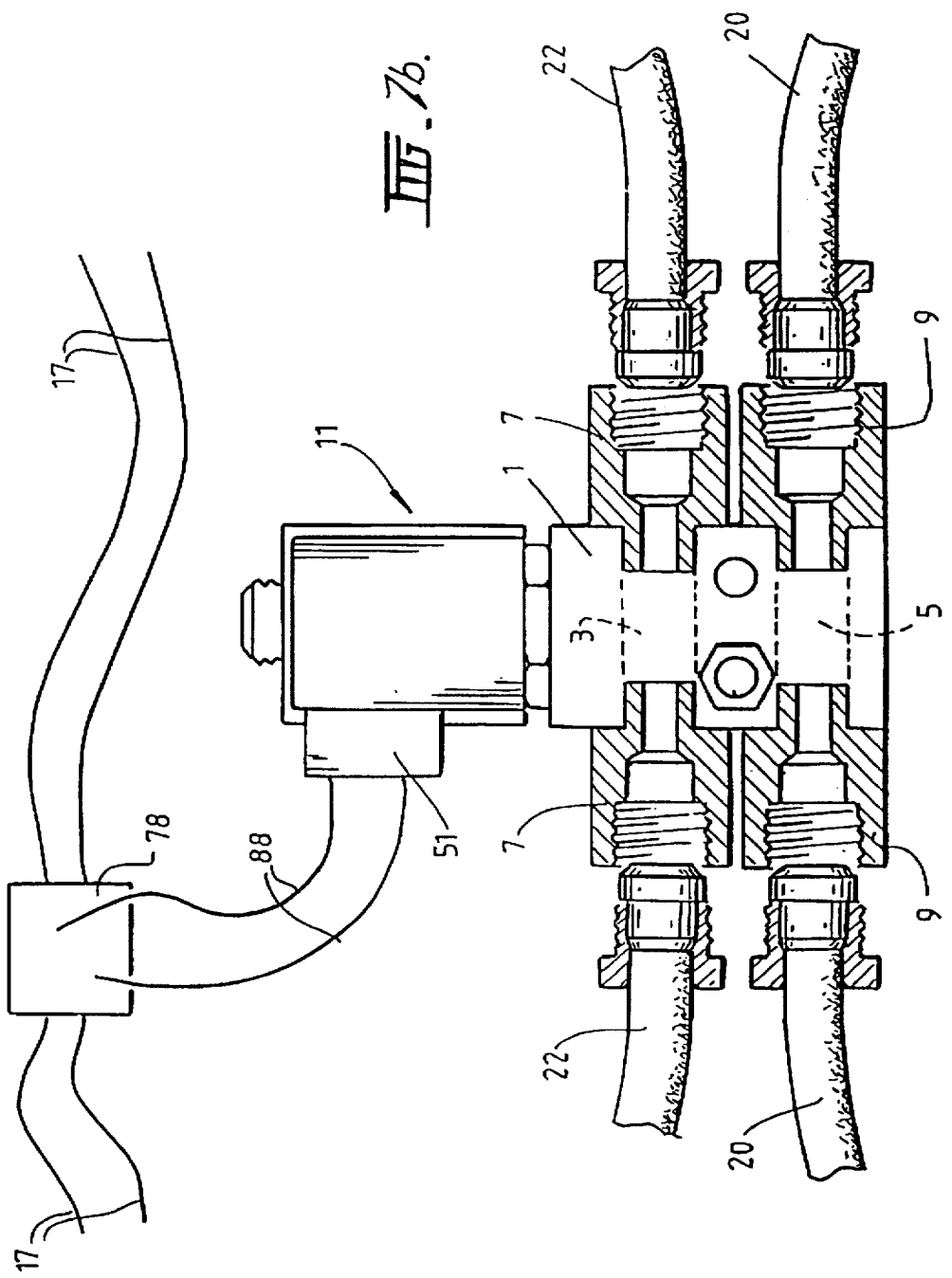
FIG. 7B shows installation of a device according to another embodiment.

FIGS. 7, 7A and 7B show how the preferred fluid supply system shown in FIGS. 2 and 5 can be installed into the control line and supply line of a prime mover/trailer combination. As is shown in FIG. 7, cuts 66 and 68 are made in the supply and control lines respectively and at 70 and 72 in the electric circuit 17.

FIG. 7A shows how a fluid control system generally of the type shown in FIG. 5 can be installed. As previously described the supply line 20 supplies compressed air from a source of compressed air (not shown) in the direction of arrow A to a reservoir 15 (see FIG. 1) at the rear of the trailer. A control line 22 transmits pneumatic signals from the foot valve (not shown) in the prime mover also in the direction of arrow A to the relay valve 14 (see FIG. 1) in the trailer. Electrical lines 17 carry electrical signals which are initiated when the brake pedal is depressed in the prime mover to the brake lights 19 (see FIG. 1) also in the direction on arrow A.

At a convenient position on the trailer where all 4 lines 20, 22 and 72 are in reasonably close proximity cuts 66, 68, 70 and 72 are made. A conventional T-piece 74 is inserted into the cut 66 of the supply line 20. A conventional T-piece 76 is inserted into the cut 68 of the control line 22. An electrical connector block 78 is inserted into the cuts 70 and 72 of the wires 17. A branch supply conduit 80 (FIG. 7A) connects the T-piece 74 to the inlet 82 of the control valve 84. The outlet 86 of the control valve 84 is connected to the T-piece 76. Wires 88 from the control valve 84 are joined to the appropriate portions of the connector block 78. Having been installed in this way, the fluid control system 40 can be deactivated, say by an electrical component failure, without any effect on the integrity of operation of the brake system. Also the control circuit 40 doe snot effect the brakes generally except during the first 2 seconds of brake application. This arrangement is also easy to install and remove if necessary. Of course, the described T-pieces and connector block could also be inserted between existing joining components.

FIG. 7B shows how the device shown in FIG. 2 is installed. The connector block 17 is joined into the circuit 17 and the cut ends of the lines 20 and 22 are coupled to the connectors 7 and 9 associated with the bores 3 and 5.

Figure 8:
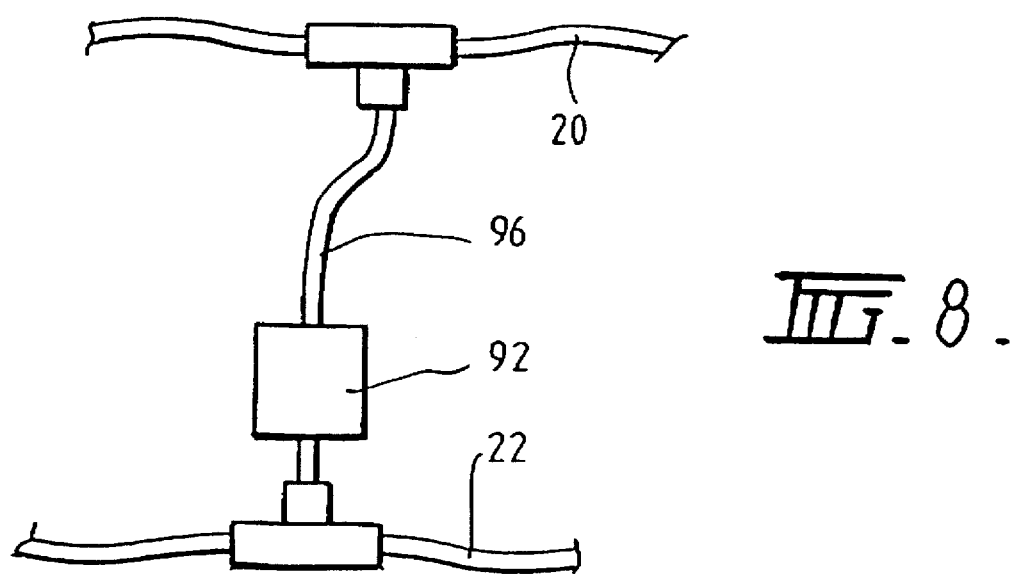
FIG. 8 shows an arrangement according to a further embodiment.
Figure 9:
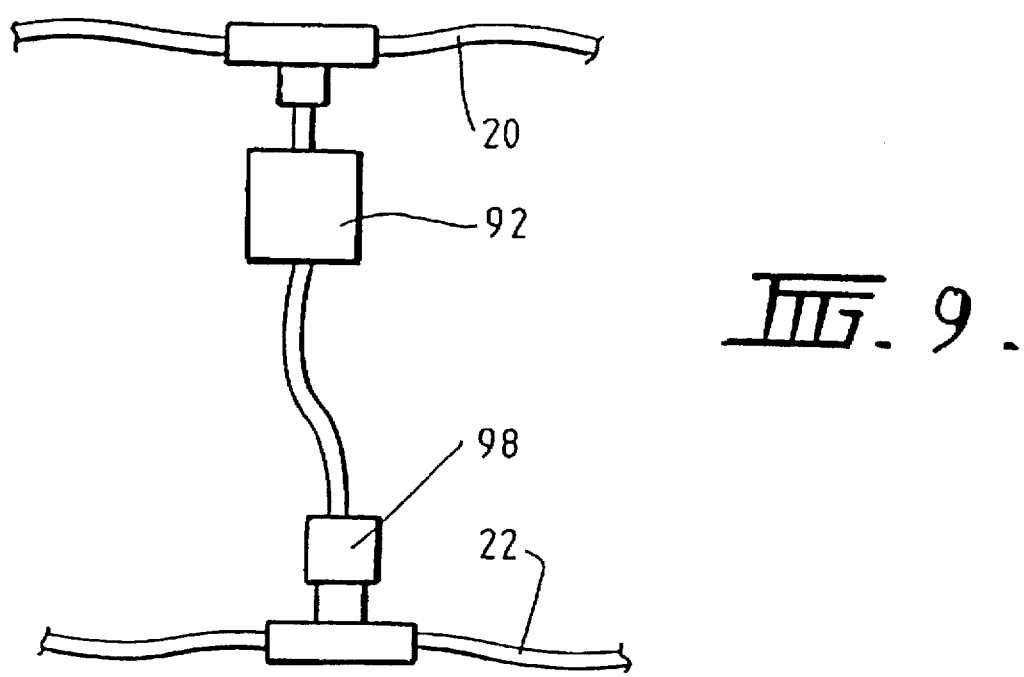
FIG. 9 shows an arrangement according to a still further embodiment.

With reference to FIGS. 8 and 9, like numerals represent like components. FIG. 8 schematically represents the General arrangement described in earlier embodiments. Control valve 92 is connected in close proximity to the control line 22. The branch supply conduit 96 connects the control valve 92 to the supply line 20. Electrical wires (not shown) carry the electrical signal to activate the control valve 92. In situations where the branch conduit is long or prone to damage, the improved arrangement schematically in FIG. 9 has the control valve 92 connected in close proximity to the supply line 20. A check valve 98 is connected in close proximity to the control line 22. The branch supply conduit 96 connects the check valve 98 to the control valve 92. Electrical wires (not shown) connect to the control valve 92 in the usual way. The check valve 98 is of conventional design and is orientated to allow a flow of compressed air from the control valve 96 to the control line 22, but blocks flow in the opposite direction. Preferably, the check valve would be built near the outlet of the branch supply conduit where the compressed air is directed down the control line.

With this arrangement, should any damage occur to the branch supply conduit 96 the check valve 98 prevents egress of air from the control line 22, and the control valve 92 prevents uncontrolled egress of air from the supply line 20.

Although in the preferred embodiment the system has been disclosed for connection between a prime mover and a trailer and it would be possible to use the system in road trains where the branch supply conduit 42 is installed between trailers of the road train.

Since modifications within the spirit and scope of the invention may readily be effected by persons skilled within the art, it is to be understood that this invention is not limited to the particular embodiment described by way of example hereinabove.

The claims defining the invention are as follows:

1. A vehicle brake system for a vehicle which includes a tractor and a trailer which can be connected to and disconnected from the tractor, said brake system including:

a relay valve for supplying fluid to brakes of the vehicle to activate the vehicle brakes;

a fluid supply coupled to the relay valve so that, upon actuation of the relay valve, supply fluid is supplied from the fluid supply via the relay valve to the vehicle brakes to actuate the vehicle brakes;

a control line having a first control line portion which is coupled to the tractor and a second control line portion which is coupled to the trailer, and which is decoupled from the tractor when the trailer is disconnected from the tractor, the first control line portion having a first connector and the second control line portion having a second connector for detachable connection to said first connector so that the first and second control line portions can be coupled together when the trailer is connected to the tractor, the control line being coupled to the relay valve so that upon depression of a brake pedal in the tractor, a control signal is supplied down the control line to the relay valve to actuate the relay valve; and fluid supply means for supplying fluid from the fluid supply to the control line to prime the control line when the brake pedal is depressed, the fluid supply means being connected to the tractor.

2. The fluid control system according to claim 1, wherein: the fluid supply means includes a nozzle having an outlet directed in the longitudinal direction of the control line for supply of the fluid from the fluid supply in the longitudinal direction of the control line.

3. The fluid control system according to claim 2, wherein the fluid supply further includes a solenoid valve for selectively enabling the fluid to flow from the fluid supply to the control line.

4. The fluid control system according to claim 2, wherein the outlet of the nozzle has a cross-sectional area which is smaller than the cross-sectional area of the control line in the vicinity of the outlet.

5. A vehicle brake system for a vehicle which includes a tractor and a trailer which can be connected to and disconnected from the tractor, said brake system including:

a relay valve for supplying fluid to brakes of the vehicle to activate the vehicle brakes;

a fluid supply coupled to the relay valve so that, upon actuation of the relay valve, supply fluid is supplied from the fluid supply via the relay valve to the vehicle brakes to actuate the vehicle brakes;

a control line having a first control line portion which is coupled to the tractor and a second control line portion which is coupled to the trailer, and which is decoupled from the tractor when the trailer is disconnected from the tractor, the first control line portion having a first connector and the second control line portion having a second connector for detachable connection to said first connector so that the first and second control line portions can be coupled together when the trailer is connected to the tractor, the control line being coupled to the relay valve so that upon depression of a brake pedal in the vehicle, a control signal is supplied down the control line to the relay valve to actuate the relay valve; and fluid supply means for supplying fluid from the fluid supply to the control line to prime the control line when the brake pedal is depressed, the fluid supply means being connected to a front portion of the trailer.

6. The fluid control system according to claim 5, wherein:

the fluid supply means includes a nozzle having an outlet directed in the longitudinal direction of the control line for supply of the fluid from the fluid supply in the longitudinal direction of the control line.

7. The fluid control system according to claim 6, wherein the fluid supply further includes a solenoid valve for selectively enabling the fluid to flow from the fluid supply to the control line.

8. The fluid control system according to claim 6, wherein the outlet of the nozzle has a cross-sectional area which is smaller than the cross-sectional area of the control line in the vicinity of the outlet.

9. A fluid control system for a brake system, including:

a pressurized fluid supply means for supplying pressurized fluid;

a relay valve coupled to the pressurized fluid supply means;

a control line coupled to the relay valve for supplying a control signal to actuate the relay valve to enable the relay valve to supply pressurized fluid from the pressurized fluid supply means to actuate brakes of a vehicle; and priming fluid supply means coupled to the control line for directing priming fluid in the longitudinal direction of the control line for priming the control line.

10. The fluid control system according to claim 9, wherein:

the priming fluid supply means includes a nozzle having an outlet directed in the longitudinal direction of the control line for supplying the fluid from the fluid supply in the longitudinal direction of the control line.

11. The fluid control system according to claim 10, wherein the priming fluid supply further includes a solenoid valve for selectively enabling the fluid to flow from the fluid supply to the control line.

12. The fluid control system according to claim 10, wherein the outlet of the nozzle has a cross-sectional area which is smaller than the cross-sectional area of the control line in the vicinity of the outlet.

* * * * *

UNITED STATES PATENT AND TRADEMARK OFFICE
CERTIFICATE OF CORRECTION

PATENT NO. : 5,673,977
DATED : October 7, 1997
INVENTOR(S) : CAMM

It is certified that error appears in the above-identified patent and that said Letters Patent is hereby corrected as shown below:

On title page, add the assignee information as follows:

[73] Assignee: John James Camm, James Owen Camm and Stephen John Camm, all of Victoria, Australia Signed and Sealed this Fifth Day of October, 1999

Attest:

Q. TODD DICKINSON

Attesting Officer

Acting Commissioner of Patents and Trademarks